United States Patent

Kroemer et al.

Patent Number: 5,587,969
Date of Patent: Dec. 24, 1996

[54] PROCESS FOR THE RECOGNITION AND SEPARATION OF USEFUL AND INTERFERING ECHOES IN THE RECEIVED SIGNALS OF DISTANCE SENSORS WHICH OPERATE IN ACCORDANCE WITH THE PULSE-ECHO PRINCIPLE

[75] Inventors: Nils Kroemer, Hohenstein-Ernstthal; Martin Vossiek, München; Peter-Christian Eccardt, Ottobrunn; Valentin Magori, München, Germany

[73] Assignee: Siemens Aktiengesellschaft, Munich, Germany

[21] Appl. No.: 522,310

[22] PCT Filed: Mar. 10, 1994

[86] PCT No.: PCT/DE94/00249

§ 371 Date: Sep. 5, 1995

§ 102(e) Date: Sep. 5, 1995

[87] PCT Pub. No.: WO94/22033

PCT Pub. Date: Sep. 29, 1994

[30] Foreign Application Priority Data

Mar. 16, 1993 [DE] Germany ............ 43 08 373.0

[51] Int. Cl.$^6$ ............ G01S 15/00; G01S 7/52; G01F 23/28
[52] U.S. Cl. ............ 367/99; 367/908
[58] Field of Search ............ 367/99, 100, 908, 367/901; 73/290 V; 364/561; 342/123

[56] References Cited

U.S. PATENT DOCUMENTS

| | | | |
|---|---|---|---|
| 4,380,807 | 4/1983 | Reynard | 367/97 |
| 4,821,569 | 4/1989 | Soltz | 73/290 V |
| 4,972,386 | 11/1990 | Lau | 367/99 |
| 4,992,998 | 2/1991 | Woodward | 367/99 |
| 5,060,205 | 10/1991 | Phelan | 367/98 |
| 5,157,639 | 10/1992 | Leszczynski | 367/99 |

FOREIGN PATENT DOCUMENTS

| | | |
|---|---|---|
| 0340953 | 11/1989 | European Pat. Off. . |
| 0346687 | 12/1989 | European Pat. Off. . |
| 0459336 | 12/1991 | European Pat. Off. . |
| 3821577 | 1/1990 | Germany . |
| 3337690 | 6/1990 | Germany . |

OTHER PUBLICATIONS

"Ultrasonics in Solids Level Measurement," Duncan, Advances in Instrumentation and Control, vol. 46, Part 2, (1991), pp. 1355–1366.
"Ultrasonic Presence Sensors with Wide Range and High Local Resolution," Magori et al., IEEE Trans. on Ultrason., Ferroelec., and Freq. Cont., vol. UFFC–34, No. 2, Mar. 1987, pp. 202–211.

*Primary Examiner*—Ian J. Lobo
*Attorney, Agent, or Firm*—Hill, Steadman & Simpson

[57] ABSTRACT

In a first step, an individual echo is associated with each local maxima in the received ultrasonic signal. Subsequently, characteristic features such as time position, amplitude and form factor of each respective individual echo are detected numerically for the individual echo. In a second step, the mentioned features are subjected to a fuzzy evaluation. The features form the input variables of the evaluation. A multiple echo probability for each individual echo is available as the result. With this awareness, with the aid of the a priori knowledge and with the aid of the awareness of the history, it is possible, for example, to draw conclusions concerning the filling level of the bulk material in containers in which the surface of the bulk material is at times masked for the ultrasonic beam by the stirring apparatus.

7 Claims, 7 Drawing Sheets

Echoindex

PROCESS FOR THE RECOGNITION AND SEPARATION OF USEFUL AND INTERFERING ECHOES IN THE RECEIVED SIGNALS OF DISTANCE SENSORS WHICH OPERATE IN ACCORDANCE WITH THE PULSE-ECHO PRINCIPLE

BACKGROUND OF THE INVENTION

1. Field of the Invention

The invention relates to ultrasonic distance sensors based on the pulse-echo process with increased measurement certainty and improved suppression of interfering echo signals. Significant areas of application are non-contact distance measurement for the positioning of workpieces, collision protection or filling-level metrology.

2. Description of the Prior Art

Ultrasonic sensors are known which determine the distance between the sensor and a sound-reflecting object by measuring the transit time of a sound signal from the sensor to the object and back. In this case, the echo is usually detected in that the exceeding of a prescribed threshold value in the received signal is evaluated. This process for distance measurement usually evaluates the transit time of the first detected echo. Any possibly following echoes from other objects situated within the detection range of the sensor are not, in contrast, further processed. By means of time-window control according to Mágori, V.; Walker, H.: Ultrasonic presence Sensors with wide range and high local resolution. IEEE Trans. Ultrasonics, Feroelectrics and Frequency Control, UFFC-34, No. 2, Mar. 1987, p. 202–211, the permissible detection range for echo signals can in this case be varied in the desired manner. In this manner, echoes from objects at differing distances from the sensor can also be detected, in that the evaluation time window is cyclically displaced over the measurement range; in this case, the resolution of the individual echoes and the total duration of measurement increase as the length of the time window decreases.

Processes for the processing of ultrasonic echo signals are moreover known in which the received signal is digitally sampled and stored in a memory; in this case, the received signal can also be the demodulated envelope curve of the echoes (European Application 0 459 336). The signal processing takes place following the recording of the received signal by extraction of the echoes by means of a suitable process, e.g. matched filter+threshold value detection. In this manner, all echoes occurring within one measurement can be detected.

Further, in the process which is described in Advances in Instrumentation and Control, Vol. 46, part 2, 1991, Research Triangle Park, NC, US, Duncan: "Ultrasonics in Solids Level Measurements", pages 1355–1366, the emitted and subsequently received ultrasonic signal is digitized by means of a microprocessor and stored as an envelope curve. The process relates to the measurement of the filling level of a container., To determine the useful echo, the echo profile of the empty container is compared with the echo profile of the filled container. Furthermore, it is possible to recognize the useful echo in that a priori knowledge of the nature of the filling material situated in the container and the echo characteristic thereof are used for the recognition of the useful echo.

Furthermore, processes for the suppression of undesired echoes contained in the received signal, for example due to interfering objects which, in addition to the measured object, are situated within the detection range of the sensor, are known. If the interfering objects are spatially fixed and at the same time the range of movement of the measured object is restricted, then an adequate suppression of interfering echoes can be achieved by appropriate selection of the evaluation time window.

Furthermore, it is known that interfering object echoes can be suppressed in that, in a learning phase in which the measured object is not situated within the pickup range of the sensor, in the first instance all interfering object echoes are detected and filed in a memory (German OS 33 37 690). During the measurement operation, the currently detected echoes are compared with the learned echoes. In the event of an adequate concordance, the echo is classified as an interfering object echo and appropriately suppressed, while the remaining echoes are associated with measured objects.

In German OS 33 37 690 and European Application 0 459 336, processes are described which mask out interfering echoes caused by multiple reflections between the sensor and an object in that the maximum transit time to be evaluated is limited, so that echoes occurring outside this transit time are disregarded. In the case of the solution presented in European Application 0 459 336, the echo amplitude can additionally also be evaluated as criterion for the multiple echo suppression. However, these processes are in general unsuitable for measurement situations involving a number of objects in the pickup range of the sensor.

Furthermore, processes are known for the suppression of interfering echoes in the basis of plausibility checks (German OS 38 20 103 and German OS 38 21 577). Since the extent which the measurement situation can change is limited due to the finite speed of movement of objects, echoes are evaluated only when their time position and amplitude are sufficiently plausible on the basis of their extent of deviation from previous measurement situations. In this manner, interfering signals which occur stochastically, in particular can be reliably suppressed.

It is common to all above known processes for the evaluation of echo signals in the case of ultrasonic distance sensors that an object is associated with each echo, which is detected in the received signal and which is not a stochastic interfering signal, within the maximum transit time to be evaluated; in this case, the distance from the sensor is obtained from the sound transit time of the echo. A disadvantage of these known processes is that, on this basis, echoes which arise for example as a result of multiple reflections between the sensor and an individual measured object and which do not lie outside the maximum transit time to be evaluated are thus also associated, erroneously, with further, actually non-existent objects. This may lead to very great errors in the assessment of measurement situations, especially when measured objects are situated at a short distance from the sensor.

The sound signal may be reflected repeatedly between the acoustic transducer and the objects which are situated within the pickup range of the sensor. As a function of the distance between the object and the sensor, the object reflectivity and the geometry of the acoustic transducer, as well as of the propagation attenuation, these multiple echoes decay more or less rapidly. When using a planar transducer surface or reflector surface and in the case of a short distance between the transducer and the object, the decay time constant of the multiple echoes is in the order of magnitude of the single sound transit time. The latter is obtained from the path from the sensor to the object and back. As a result, a plurality of echoes of the same object are detected in the received signal.

Additional interfering echoes may occur where a plurality of objects are situated within the pickup range of the sensor. This is caused by reflection paths between the individual objects or multiple reflections on various objects.

In the case of all known processes for echo-signal processing, the problem exists that the interfering echoes arising as a result of multiple reflections are not distinguished from the direct object echoes; this leads to erroneous measurements in the case of many situations occurring in practice.

SUMMARY OF THE INVENTION

It is an object of the preceding invention to specify a process which eliminates the above described interfering echoes.

The above object is achieved in accordance with the principles of the present invention in a process for the recognition and separation of useful and interfering echoes in the received signal of pulse-echo distance sensors, wherein the maxima in the received signal are detected and an echo is associated with each maximum, form factors which characterize the form of the echoes are produced and stored, the amplitudes and the times of occurrence of the maxima are measured and stored, differences between the measured amplitudes and expected amplitude values are determined, differences between the measured times of occurrence of the maxima and expected values for such occurrence times are determined, differences between the form factors and expected form factor values are determined, the probability that a multiple echo has been received is assumed to be larger as the aforementioned differences become smaller, and wherein the probability of the presence of an interfering echo is assumed to be larger as the probability of the presence of a multiple echo increases.

The invention can advantageously be used for intelligent distance sensors having object-selective measurement properties, especially for distance measurement under conditions which are made more difficult by interfering objects.

DESCRIPTION OF THE PREFERRED EMBODIMENTS

Figure 1:
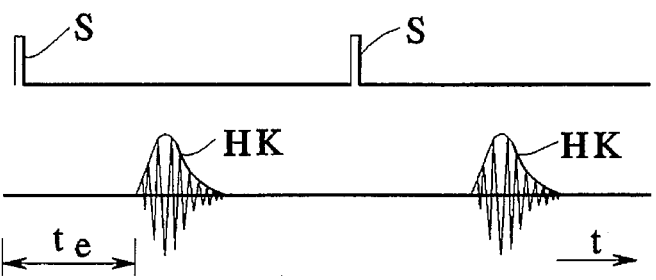
FIG. 1 illustrates the principle of the pulse-echo process.
Figure 2:
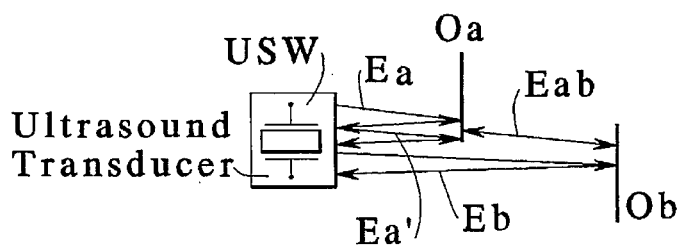
FIG. 2 illustrates the creation of multiple echoes by reflection of the sound signal at the transducer or between the various objects.

Non-contacting ultrasonic distance measurement is based on the determination of the transit time of a sound signal from an acoustic transducer to the measured object and back (pulse-echo process). The principle is shown in FIG. 1. The pulsed emission signal S is emitted periodically, reflected at the reflector (measured object) and is available at the output of the ultrasonic transducer, delayed by the time $t_e$. In most cases, only the envelope curve signal HK of the high-frequency received signal is evaluated. Depending upon the selected sound frequency, the range of measurement can be from a few millimeters to tens of meters. Using ultrasound, a high path resolution in the direction of the sound propagation can be achieved with relatively low expenditure. In contrast to the optical system, an important advantage is the high degree of insensitivity to dust and illumination conditions, as well as to the material condition, color and surface roughness of the measured objects. The shape and amplitude of the echo signals may depend, to a great extent, upon the orientation as well as the geometry of an object. This is caused by shadowings, specular reflections and interference. These act as interfering variables for the purposes of distance measurement. A further problem is that in the case of highly reflective objects, as a consequence of the reflection of the received signal at the transducer, multiple echoes frequently occur, which simulate the presence of further objects (see FIG. 2). This can falsify the result in cases wherein the measurement depends on a determination of distances other than merely the shortest distance to an object within the range of the acoustic signal.

The emission signal S, which is emitted by the ultrasonic transducer USW, is in the first instance reflected at the object $O_a$. $E_a$ represents the envelope curve HK of the first useful echo of the object $O_a$. The second echo $E_{a'}$ (first multiple echo) arrives at the ultrasonic transducer USW before the second useful echo $E_b$, which originates from the object b. $E_{a''}$ is the second and $E_{a'''}$ the third multiple echo of the object $O_a$. $E_{b'}$ is the first multiple echo of the object $O_b$. $E_{ab'}$ is the echo which arises due to the parasitic reflection path between the objects $O_a$ and $O_b$.

The echoes and their respective envelope curves are provided with the following indices, and the composition of their transit times are as follows:

| Echo | Ind Ex | Transit time | Meaning |
| --- | --- | --- | --- |
| $E_a$ | 1 | $t_{e1}$ | basic echo from object a |
| $E_{a'}$ | 2 | $t_{e2} = t_{e1} + t_{e1}$ | first multiple echo from object a |
| $E_b$ | 3 | $t_{e3}$ | basic echo from object b |
| $E_{a''}$ | 4 | $t_{e4} = t_{e1} + t_{e2}$ | second multiple echo from object a |
| $E_{ab'}$ | 5 | $t_{e5} = t_{e3} + (t_{e3} - t_{e1})$ | echo between a and b |
| $E_{a'''}$ | 6 | $T_{e6} = t_{e1} + t_{e4}$ | third multiple echo from object a |
| $E_{b'}$ | 7 | $t_{e7} = t_{e3} + t_{e3}$ | first multiple echo from object b |

In the case of filling-level measurement, a number of interfering variables frequently act simultaneously. The echo backscattered at the surface of bulk material possesses, in general, a substantially lower amplitude than reflections or multiple echoes generated by struts or other structural elements above the bulk material. Added to this are temporary shadowings due to stirring apparatuses as well as deposits on the container walls. Further interfering influences are provided by air turbulence and extraneous sound, which may cause amplitude fluctuations of more than 20 dB.

The object of the signal processing is to separate reliably the echo coming from the surface of the filling material. Since the envelopes of the individual echoes in the received signal do not necessarily have significant differences, simple recognition by reference to the signal shape is scarcely possible in practice.

Accordingly, the separation of useful and interfering variables takes place using a fuzzy evaluation unit. In this case, the following act as input variables:

features for the characterization of an individual echo features to describe the relations between a plurality of individual echoes history a priori knowledge.

The a priori knowledge is always situation-specific. In the case of filling-level measurement, it is assumed that the filling material produce the echo which is the furthest distant and which is not a multiple echo. The knowledge of the position of the fixed targets in the container (e.g. in the form of a learned echo profile) and of the maximum filling and emptying rates can also be used as a priori knowledge. Consideration of the history of the respective profiles of previously-received signals permits plausibility checks concerning the suppression of erroneous measurements and compensation for drift phenomena.

Figure 3:
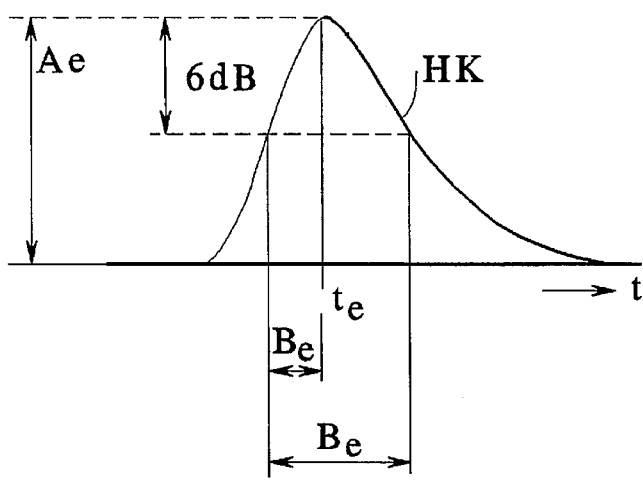
FIG. 3 illustrates the selected features of an individual echo which are analyzed in accordance with the inventive method.

The echo profile of an individual measurement must be assessed by reference to significant criteria (FIG. 3). The investigations carried out have shown that the respective echo can be described sufficiently well by the following features:

time position of the maximum transit time $t_e$ signal amplitude $A_e$ of the maximum form factor Fe (from the 6 dB widths of the maximum).

One recording of the envelope curve is sufficient to simplify the evaluation effort. All features for describing relations between in each case two echoes relative to one another are variables derived therefrom.

Each multiple echo is characterized by the fact that it may be derived from one or more preceding echoes. From these preechoes, which also may themselves be multiple echoes, it is possible to determine expected values for the features of a multiple echo, having regard to the spatial divergence of the sound signal as well as the frequency-dependent propagation attenuation.

A useful echo which occurs at time $t_e$ usually possesses a 1st-order multiple echo at time $2t_e$, a 2nd-order multiple echo at time $3t_e$ etc. Accordingly, the following is applicable for the expected transit time $t_e$ of a multiple echo at the position k (in this connection, see also FIG. 2):

$$t_{ek}=t_{ei}+t_{ej} \ (1<=i<=k, \ 1<=j<=k)$$

i,j,k: echo index; a higher index corresponds to a longer transit time i=j: first multiple echo of the object at the position i.

Additional multiple echoes may be generated by reflection paths between a plurality of individual objects. In the simplest case (thin plates as reflectors), the following is then applicable:

$$t_{ek}=t_{ej}+(t_{ej}-t_{ei}) \ (i \neq j; \ 1<=i, \ j<k)$$

The amplitude of a signal permits statements concerning the losses which occur. The amplitude decreases at least by the factor 1/r. In this case, r represents the distance from the ultrasonic transducer. There is, in addition, an attenuation α of for example 0.015 dB/λ. This decrease may be even substantially greater, however, and is dependent especially upon the occurring reflection factors. With regard to the amplitude $A_e$ of a multiple echo at the position k, cf. FIG. 2 $E_a, E_{a'}, E_{a''}, E_{a'''}$, which multiple echo is composed of the preechoes i and j, the following condition must accordingly be satisfied on the basis of the divergence of the sound beam ($A_e \sim 1/t_e$) and the propagation attenuation, provided that no reflection paths between the various objects make a contribution:

$$A_{ek} \cdot t_{ek} < min\{(A_{ei} \cdot t_{ei}); \ (A_{ej} \cdot t_{ej})\}(i,j<k)$$

In the case of multiple echoes due to a reflection path between two objects i and j, at least the following is applicable:

$$A_{ek} \cdot t_{ek} < max\{(A_{ei} \cdot t_{ei}); \ (A_{ej} \cdot t_{ej})\}(i,j<k)$$

The signal shape of an echo can be characterized by differing parameters such as, for example, gradient and/or decay time or the ratio of amplitude to width. For practical purposes, a form factor Fe derived from a plurality of signal shape parameters appears to be expedient. For the evaluation process developed within the context of this invention, the form factor was determined from the envelope as follows (see FIG. 3):

$$F_e=(B_a 6 \ dB)/(B_e/6 \ dB)$$

In this equation, $B_a$ is the time which elapses between the attainment of the amplitude maximum $A_e$ and the 6dB fall lying to the left thereof. Be is the time which elapses before the signal has decayed from the amplitude maximum $A_e$ to the 6 dB fall lying to the right thereof.

In the case of reflections at planar or simple regularly curved surfaces, the signal shape remains essentially preserved. In these cases, multiple echoes possess a similar envelope to the associated preechoes i and j:

$$F_{ek}=F_{ei} F_{ej}$$

The process for the classification of an echo as useful or multiple echo is based on the concept that the features of each detected echo are compared with the expected values computed from the preechoes. Normalized feature differences prove to be particularly suitable for this purpose.

$D_{Mm}=(M_{means \ m}-M_{exp \ m})/M_{exp \ m}$ $M_{meas}$: measured feature m, where the feature m may be $t_e$, $A_e$ or $F_e$.

$M_{exp}$: expected value of the feature m $D_M$ m: scaled feature difference

Figure 4A:
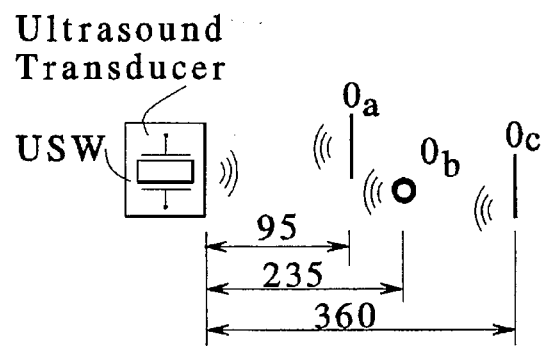
FIGS. 4a through 4e illustrate a numerical example for explaining the principle of multiple echo evaluation in accordance with the inventive method.
Figure 4B:
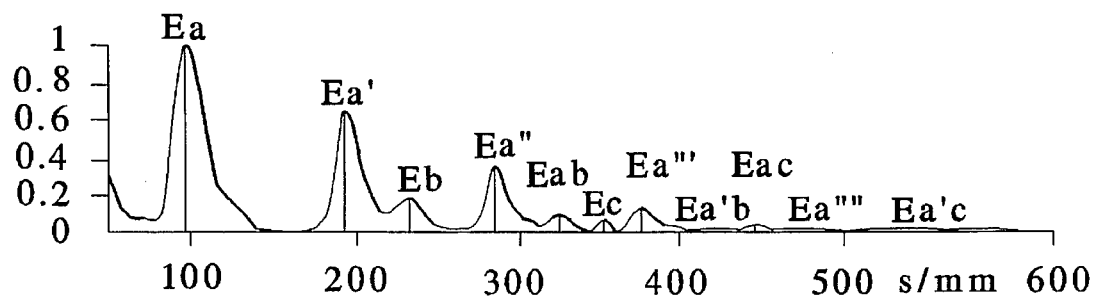
Figure 4C:
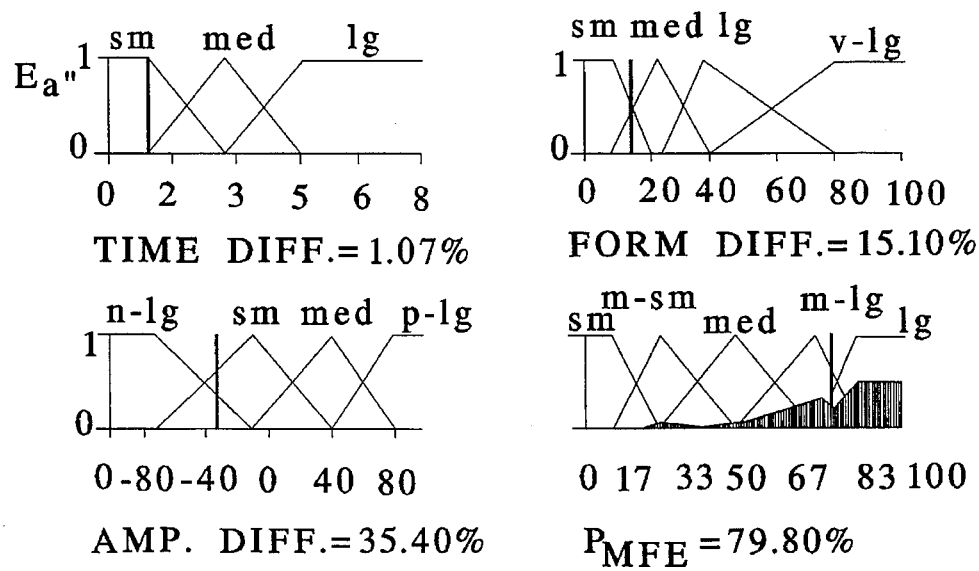
Figure 4D:
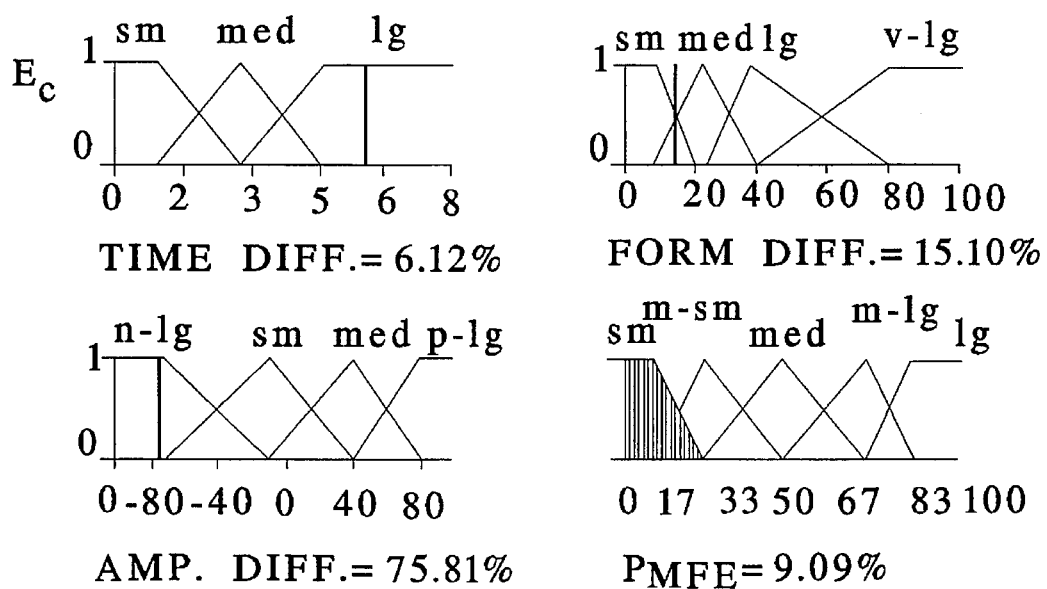
Figure 4E:
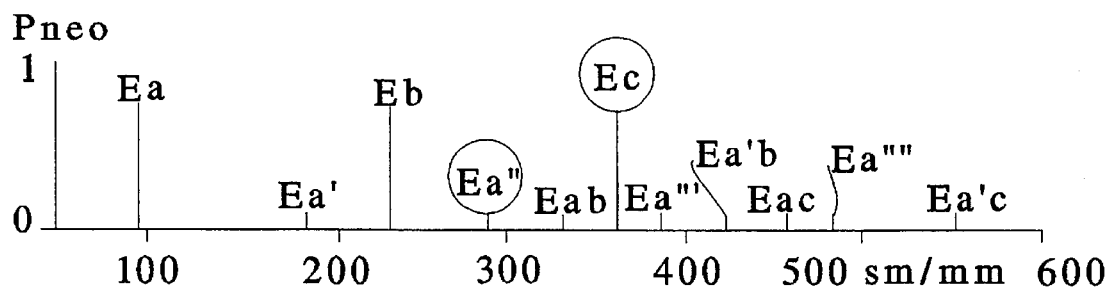
Figure 5A:
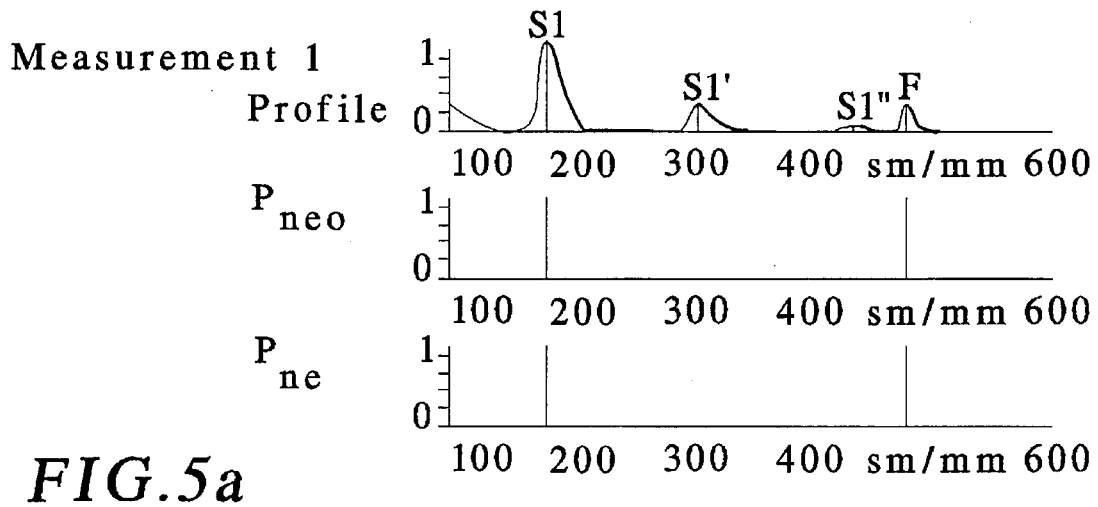
FIGS. 5a through 5e illustrate the echo profile evaluation in accordance with the inventive method in the case of a time-varying echo profile, for example, due to the rotary motion of a stirring apparatus.

In this specific case, small differences mean that the relevant echo can, with relatively high probability, be allocated to the "multiple echo" class. Due to the above listed factors influencing the sound propagation, the expected values $M_{exp}$ always represent only estimated values. A binary yes/no decision in multiple echo assessment is thus hardly meaningful at all. Accordingly, the difference values $D_{Mi}$ are used as input variables for a fuzzy evaluation unit. FIGS. 4a 4e illustrate the process with reference to a measurement situation and the associated echo profile, using the example of two partial echoes ($E_{a''}$ and $E_e$). FIG. 4a illustrates the actual distance in millimeters between an ultrasound transducer USW and objects $O_a$, $O_b$ and $O_c$, and FIG. 4b illustrates the resulting echo profiles. As a result of the defuzzification, shown for the time difference, the amplitude difference and the form difference for each of partial echoes $E_{a''}$ (FIG. 4c) and $E_e$ (FIG. 4d), a value is allocated to each partial echo, which value describes the multiple echo probability $P_{MFE}$. In FIG. 4e, the ordinate shows the probability for a useful echo $P_{neo}$, which probability is the complement to the multiple echo probability $P_{MFE}$. In FIG. 4c and 4d, 5m signifies a small difference, mad an average, lg large, n-lo a negative large and p-lg a positive large, v-lg a very large, m-sm a moderately small and m-lg a moderately large difference.

Since the speed of movement of objects within the pickup range of the sensor is always limited, the echo profile cannot charge discontinuously from one measurement cycle to the other. This knowledge is usually used for the plausibility assessment of individual echoes. Since, on the other hand, the speed of the change in the situation is only infrequently known precisely and echoes may strongly fluctuate due to air movements or temporary shadowings, processes using fixed threshold values have proved to be suitable only to a limited extent.

Figure 5B:
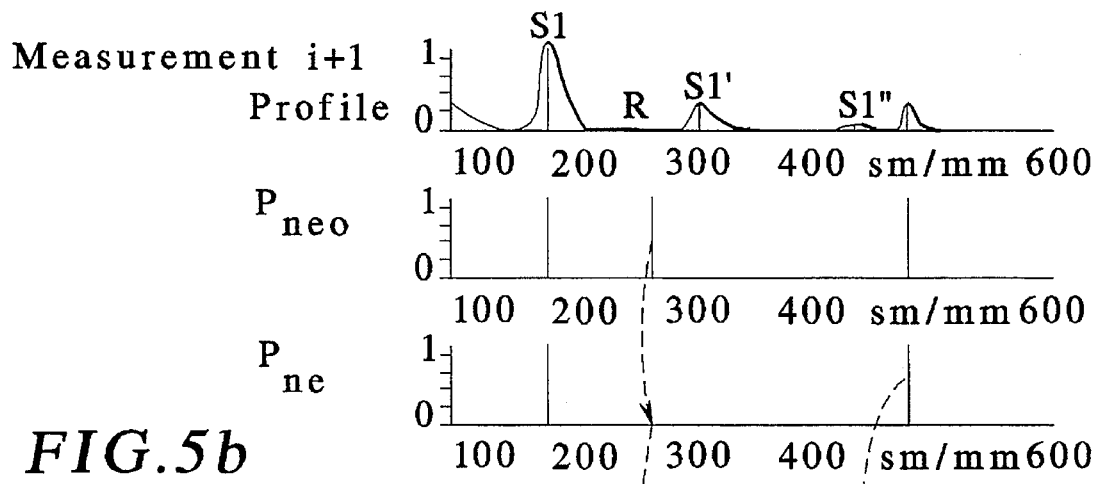
Figure 5C:
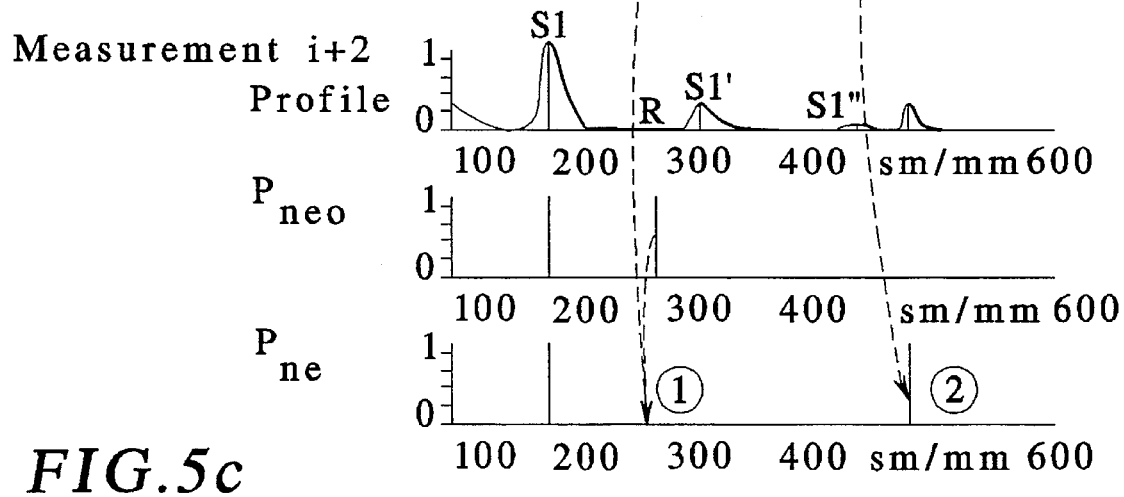
Figure 5D:
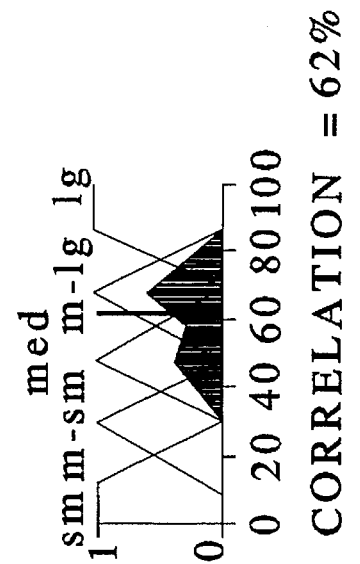
Figure 5D:
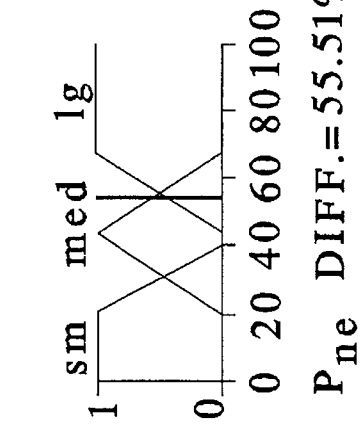
Figure 5D:
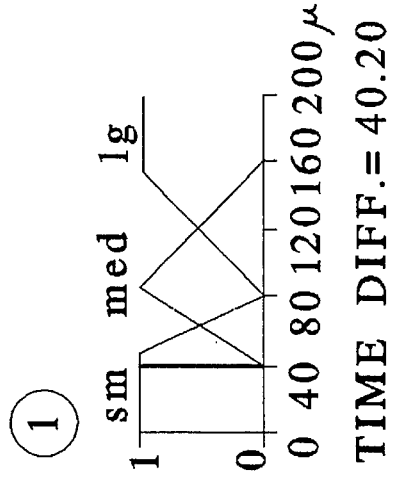
Figure 5E:
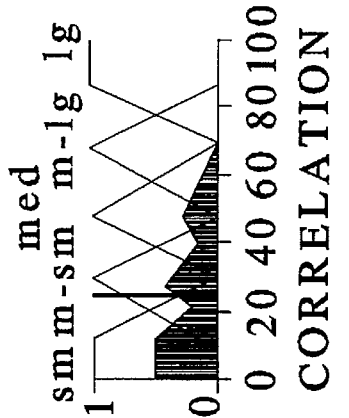
Figure 5E:
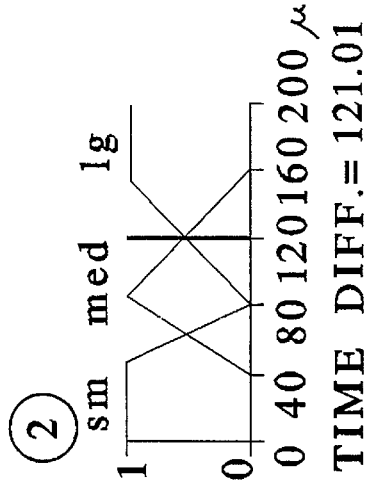

In the case of the filling-level sensor presented here, a plausibility check takes place with the aid of fuzzy rules. In this case, each individual echo of the current measurement is compared with the echoes of the preceding measurement cycle. A "good" correlation is present when both the transit time difference and the difference of the multiple echo probabilities $P_{MFE}$ are "small". The absolute values for "small", "moderate" and "large" transit time differences are obtained, for example, from the maximum filling speed and measurement rate. Depending upon the correlation of an echo of the preceding measurement, the value for the useful echo probability $P_{neo}=1-P_{MFE}$ of the current echoes is multiplied by a weighting factor derived from the defuzzification. In the case of suddenly vanishing echoes (e.g. masking by stirring apparatus) the current profile is supplemented by the corresponding echo from the preceding measurement with reduced weighting. Accordingly, the respectively last measurement includes the weighted cumulative result from a plurality of preceding measurement cycles. The process is diagrammatically shown in FIGS. 5a, 5b and 5c for successive measurements i, i+1 and i+2, with the corresponding defuzzification for the echoes identified as 1 and 2 (time difference, $P_{neo}$ difference and concordance) being respectively shown in FIGS. 5d and 5e.

A basic problem in ultrasonic distance measurement from a plurality of objects at the same time is generated in that genuine object echoes may be masked by multiple or other interfering reflections. In the case of filling-level measurement, the object consists in reliably detecting the sound signal reflected by the filling material; in this case, the amplitude thereof may be very small in comparison with the fixed target echoes. The process according to invention additionally makes use of the principle of comparison between the fixed target echo profile (including stirring apparatuses which are periodically situated within the pickup range of the sensor) stored in a learning phase and the signal profile recorded in the actual measurement operation. In contrast to conventional filling-level sensors, this comparison is likewise carried out as described below with the aid of fuzzy rules. Echoes with "good" correlation are allocated to fixed targets and are assessed with low weighting for the further processing. Of the remaining echoes, the echo with the greatest transit time and which possesses a low multiple echo probability is allocated to the filling material. If all detected echoes show sufficiently good correlation with the learned profile (e.g. where the filling material is situated at the height of a fixed target) the last echo is evaluated with a high useful echo probability. The assessment of the deviations between the learned and the measured echo profile is carried out in a manner similar to that previously described. The process is illustrated in FIG. 6a–6e. Advantages of the unsharp evaluation can be seen in the compensation for drifts and thus possible adaptive follow-up of the teach-in profile.

Figure 6A:
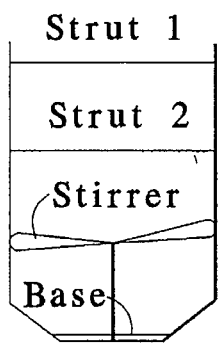
FIGS. 6a through 6c illustrate the echo profile evaluation in accordance with the inventive method by comparison of a current echo profile with a learned echo profile.
Figure 6A:
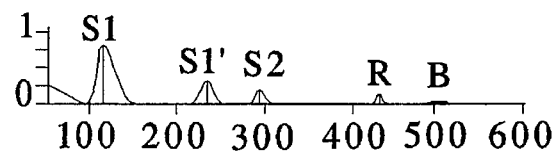
Figure 6B:
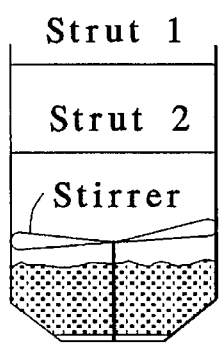
Figure 6B:
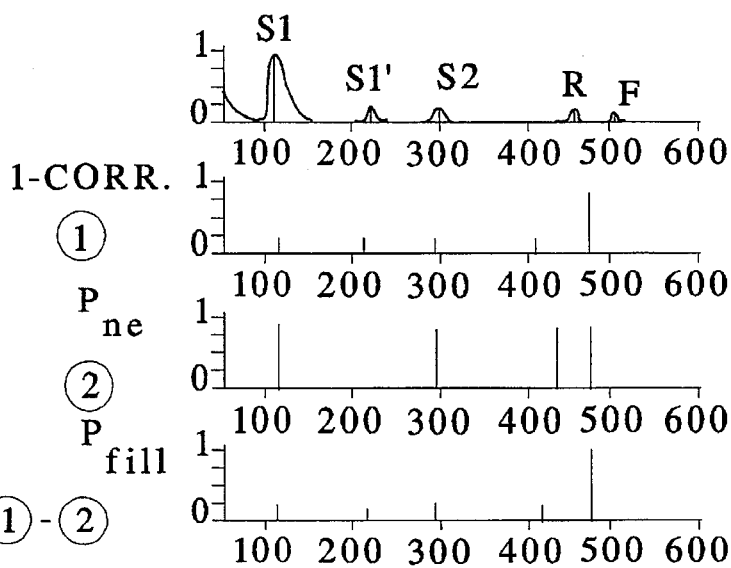
Figure 6C:
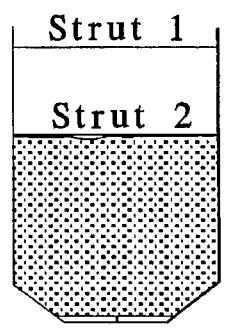
Figure 6C:
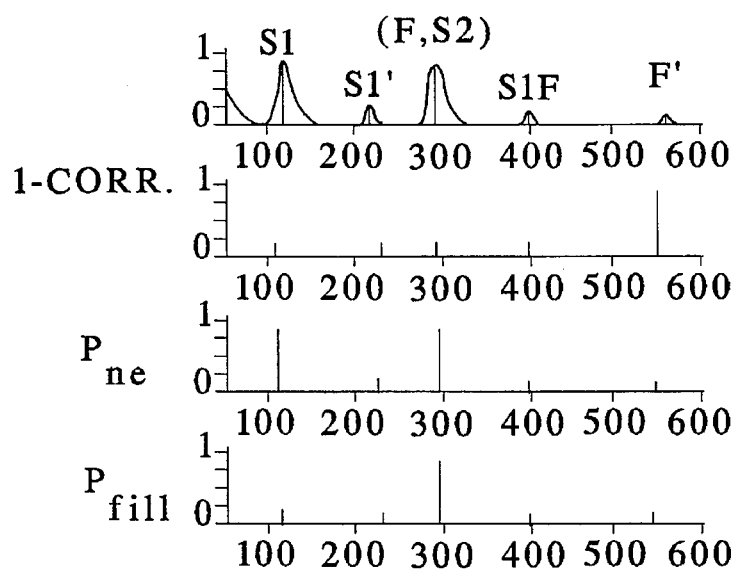

In the event of unfavorable reflection conditions at the surface of bulk material, the filling-level echo which is actually of interest may at times even be situated within the region of the noise limit of the measuring system. In this case, the detection of the useful echo over a plurality of measurement cycles is often only sporadically possible. A further error may be caused by interfering echoes which arise as a result of parasitic reflection paths between the bulk material and structural elements of the container, as shown in FIG. 6c. Since these echoes arrive at the sound receiver later than the filling-level echo, they may be misinterpreted by the evaluation.

To suppress erroneous measured value outputs, in addition to the above-described fluctuation assessment a plausibility check of the measured result is accordingly carried out. This check uses as input variables the measured values having the highest useful echo probability ($P_{NE\,max}$) from the last n measurements as well as the currently indicated value. The indicated value is always updated when the new measured value is within the tolerance zone predetermined by the maximum filling or emptying speed; in this case, a sliding average value formation is carried out to smooth the indicated profile. In the other case, the indicated value is overwritten only when all measured values of the last n cycles lie within this tolerance zone and the measured value for the echoes having the next high useful echo probability lies above a predetermined threshold. If the measured values scatter in an impermissible fashion, the last valid indicated value is preserved. This condition is at the same time signalled by an error flag via the display. The plausibility check of the indicated value may likewise take place with the aid of fuzzy controllers.

The concept of the evaluation process presented permits the stepwise testing of the individual modules. For test situations involving a plurality of reflectors, the fuzzy sets for the assessment of multiple echoes, temporal fluctuations and concordance with the teach-in-profile can individually be set up and optimized.

Figure 7:
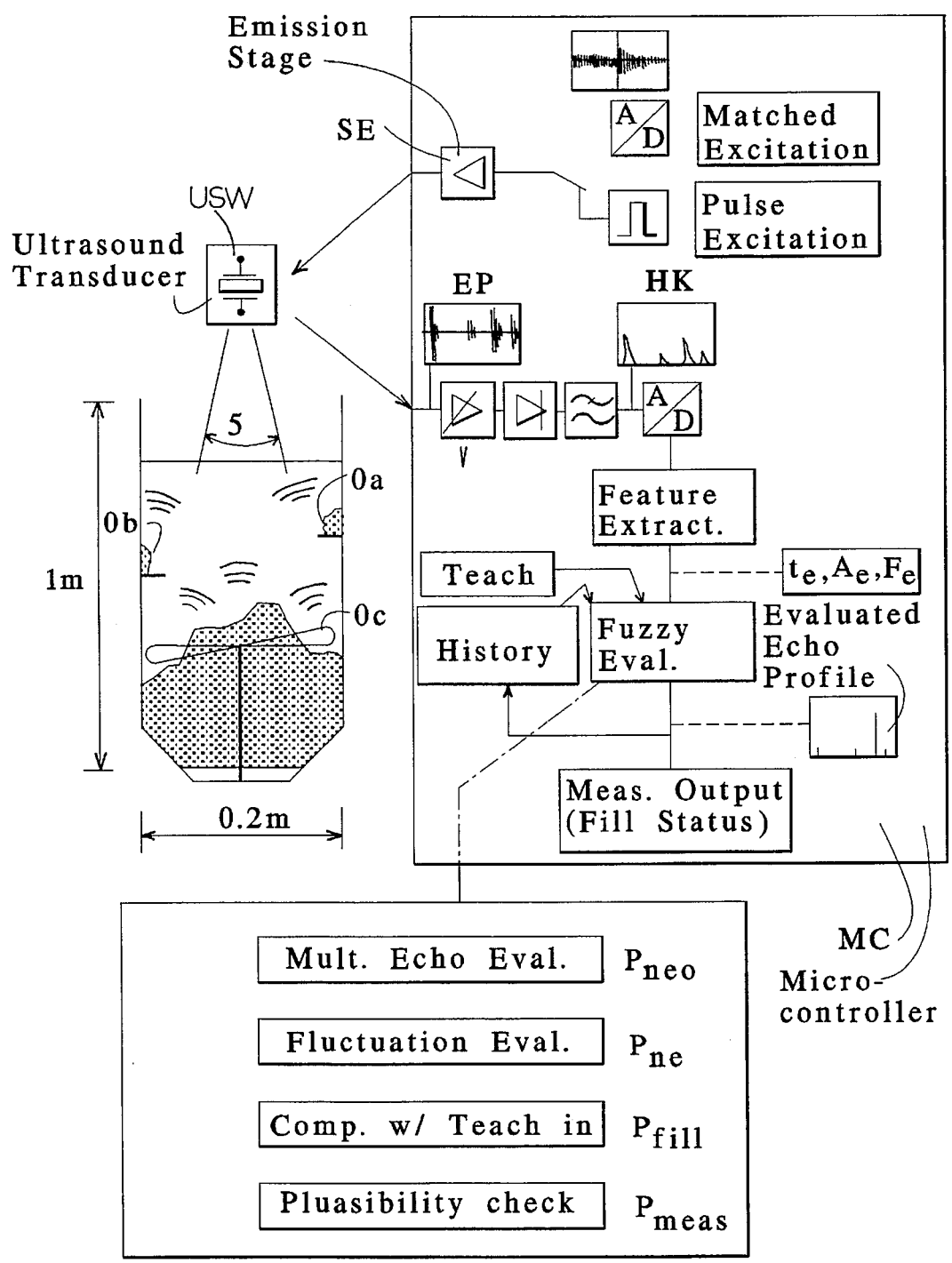
FIG. 7 illustrates a block diagram of an embodiment of circuit arrangement for filling-level measurement by echo detection as well as for the extraction of echo features in accordance with the inventive method, wherein a microcontroller is employed the control and the evaluation of the measurements.

FIG. 7 shows an apparatus for the filling-level measurement and a block diagram of the evaluation unit.

An emission pulse is generated by the microcontroller MC at predetermined time intervals and is passed via the final emission stage SE to the acoustic transducer USW. The emitted sound signal is reflected by the objects $O_a$, $O_b$, $O_c$, and upon reception by the acoustic transducer USW causes the generation of an echo profile EP. The echo profile EP is supplied to a preamplifier/envelope curve demodulator V, so as to obtain demodulated echoes. Whenever a predetermined threshold value is exceeded in the echo profile EP, a comparator (symbolized by a variable gain amplifier) delivers a corresponding output signal, the leading edge of which activates a peak detector (symbolized by a rectifier) to measure the echo amplitude as well as an integrator (symbolized by a low pass filter) to determine the width of the echo (form factor). When the maximum echo amplitude has been reached, the peak detector generates a control signal by which the content of the counter/memory assembly employed for transit time measurement is transferred to the buffer memory. Upon the occurrence of the trailing edge of the comparator signal, the individual features $t_e$, $A_e$, $F_e$ are transferred to the fuzzy evaluation for echo assessment.

The fuzzy evaluation conducts the multiple echo evaluation by the allocation of a multiple echo probability $P_{-neo}$, the fluctuation evaluation by the allocation of a fluctuation probability P ne, the comparison with the learned echoes (teach-in) by the allocation of a probability $P_{fill}$ and the plausibility check by the allocation of a plausibility probability $P_{meas}$. The multiple echo evaluation and the fluctuation evaluation are not limited, in their application, only to filling-level measurement, but the comparison with what has been learned and the plausibility investigation are specific to the measurement of filling level.

Alternatively, the complete received signal profile for the demodulated envelope curve can be sampled by means of an ADC assembly and placed in buffer memory. In addition to the echo assessment, the feature extraction is then also carried out by the appropriate software.

The investigations concerning the weighting of the echo features for the multiple echo recognition revealed that the transit time possesses the greatest evidential relevancy. The echo amplitude may be of importance especially when multiple and useful echo coincides. The form factor possesses the lowest weighting. In the case of overlapping echoes with similar amplitude, it contributes to the improved assessment of multiple echoes.

As compared with conventional processes, the described fuzzy comparison between teach-in echo profile and measured signal exhibits substantial advantages, for example when multiple reflections are generated by the bulk material itself.

The evaluation process according to the invention, which has been described herein for ultrasonic sensors, can also advantageously be used in non-contacting measuring systems which are based on the propagation of electromagnetic waves. These include, for example, pulse radar arrangements for object location at relatively long distances or microwave sensors for distance measurement. The assessment of the echo amplitudes can optimally be matched by a priori knowledge to the attenuation acting in the respective propagation medium.

Although modifications and changes may be suggested by those skilled in the art, it is the intention of the inventors to embody within the patent warranted hereon all changes and modifications as reasonably and properly come within the scope of their contribution to the art.

We claim:

1. A method for the recognition and separation of useful and interfering echoes in a received signal of a pulse-echo distance sensor, said method comprising the steps of:

detecting maxima in said received signal and associating each maxima with an echo;

identifying a form factor with each echo characterizing a form of that echo, and storing the form factors for the respective echoes;

identifying an amplitude and a time of occurrence for each maximum, and storing the respective amplitude and time of occurrence for all of said maxima;

measuring a difference between the amplitudes of the respective maxima and expected amplitude values;

measuring a difference between the time of occurrence of each maximum and expected time of occurrence values;

measuring a difference between the form factor for each echo and expected form factor values;

assigning a probability to each echo as to whether that echo comprises a multiple echo by evaluating each of the amplitude, time of occurrence and form factor differences with a smaller difference resulting in an increased probability that said echo comprises a multiple echo; and assigning a probability to each echo as to whether that echo comprises an interfering echo with the probability that said echo comprises an interfering echo being greater as the probability of said echo comprising a multiple echo increases.

2. A method as claimed in claim 1 wherein the step of identifying a form factor for each echo comprises identifying a ratio between a width of each echo measured between first and second points in time at which the amplitude of said echo assumes a selected value, and a width of said echo between said first point in time and a time at which said echo reaches its maximum.

3. A method as claimed in claim 1 wherein the step of assigning a probability to each echo as to whether that echo comprises a multiple echo comprises assigning said probability as to whether said echo comprises a multiple echo by fuzzy logic.

4. A method as claimed in claim 1 wherein the step of assigning a probability to each echo as to whether that echo comprises an interfering echo comprises assigning said probability as to whether said echo comprises an interfering echo by fuzzy logic.

5. A method as claimed in claim 1 comprising the additional step of identifying said expected value of the amplitude of a maximum for each echo as the reciprocal of a signal transit time, said signal transit time comprising a time elapsing from an emission of a pulse to a reception of said echo.

6. A method as claimed in claim 1 comprising the additional step of setting said expected value of said form factor as equal to a form factor of a preceding echo.

7. A method as claimed in claim 1 comprising the additional step of directing pulses at material in a container whose level in said container is to be determined, and identifying a fill status of said container from said received signals.

* * * * *